United States Patent
Menon et al.

(10) Patent No.: US 10,225,873 B2
(45) Date of Patent: Mar. 5, 2019

(54) SYSTEM AND METHOD FOR PERIPHERAL INITIATED HOST ARBITRATION

(71) Applicant: TEXAS INSTRUMENTS INCORPORATED, Dallas, TX (US)

(72) Inventors: Arun C Menon, Bangalore (IN); Sreeharsha Srinivas H Iyengar, Bangalore (IN); Sandeep Kamath, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 234 days.

(21) Appl. No.: 15/046,504

(22) Filed: Feb. 18, 2016

(65) Prior Publication Data

US 2017/0244715 A1  Aug. 24, 2017

(51) Int. Cl.
*H04L 29/06* (2006.01)
*H04W 76/14* (2018.01)
*H04W 4/80* (2018.01)
*H04W 12/06* (2009.01)
*H04W 12/08* (2009.01)

(52) U.S. Cl.
CPC ............ *H04W 76/14* (2018.02); *H04W 4/80* (2018.02); *H04W 12/06* (2013.01); *H04W 12/08* (2013.01)

(58) Field of Classification Search
CPC ... H04W 84/20; H04W 76/023; H04W 4/008; H04W 12/06; H04W 12/08; H04W 8/005; H04W 76/14
USPC .................................................... 726/9
See application file for complete search history.

(56) References Cited

U.S. PATENT DOCUMENTS

| | | | | |
|---|---|---|---|---|
| 2004/0203384 A1* | 10/2004 | Sugikawa | ............ | H04W 12/06 455/41.2 |
| 2016/0014550 A1* | 1/2016 | Chiddarwar | .......... | H04W 4/008 455/41.2 |
| 2016/0088424 A1* | 3/2016 | Polo | ...................... | H04W 4/008 455/41.1 |

\* cited by examiner

*Primary Examiner* — Yogesh Paliwal
(74) *Attorney, Agent, or Firm* — Michelle F. Murray; Charles A. Brill; Frank D. Cimino

(57) ABSTRACT

A system and method is disclosed for establishing authenticated Bluetooth Low Energy communication session between a slave device and a master device. The slave device lacks ability to control which mater device can connect to it; however, the after connection authentication process enables a slave device to terminate connection with unauthenticated master device.

20 Claims, 3 Drawing Sheets

SYSTEM AND METHOD FOR PERIPHERAL INITIATED HOST ARBITRATION

TECHNICAL FIELD

This disclosure relates generally to the field of pico-net device connection management and more specifically to low energy network device connection management.

BACKGROUND

Bluetooth Low Energy (BLE) also known as Bluetooth Smart or Version 4.0+ of the Bluetooth specification is the next generation of Bluetooth protocol designed for low power applications such as consumer devices (headphones, keyboards, security devices, appliances, etc.), Internet of Things (IoT), and the like. BLE is designed and optimized for low cost, low bandwidth, low power, and low complexity to provide considerably low power consumption compared to the classic Bluetooth while supporting similar communication range as the classic Bluetooth. The power-efficiency of BLE makes it suitable for devices that run for long periods on low power sources such as coin cell batteries or energy-harvesting devices.

To establish a BLE connection, a BLE enabled device (also known as peripheral device) has to be in advertising or slave mode and broadcast advertisement packets to allow for a connection with another device. The other device has to be in an Initiator or Host mode to accept the advertising packets and establish a connection with the BLE enabled device. For example, a BLE enabled headphone or keyboard will advertise its ability to make connection with a device such as a music player or computer by broadcasting advertisement packets. When the music player or computer receives the advertisement packets, it will establish a connection with the headphone or the keyboard. The host devices (e.g., music player, computer, or the like) scan for advertisement packets from a BLE enabled peripheral device and after receiving an advertisement packet, they send a connection request to the BLE enabled peripheral device. Once a connection is established, the host device assumes the role of master device and the BLE advertiser becomes a Slave device. Slave devices may have only one connection at a time with a host device while master devices may have multiple connections with different slave devices simultaneously.

When a slave device sends advertisement packets then it gets into a connection acceptance mode meaning it is ready to accept a connection from a host. Thus, any host in the communication range who receives the advertisement packet from the slave device can establish a connection with the slave device whether the host is the right device or not. For example, if a headphone initiates advertisement packets to connect to a host, then it is probably looking for a music player to connect with; however, if another host device such as for example, a computer receives the advertisement packets and sends a connection request to the headphone, then the headphone will have to accept the connection and will be connected to the computer. The slave device does not have the control over which paired master device it will connect to without using the so called directed advertisement.

In directed advertisement method, a slave device sends advertisement packets directed to a specific host address and only the specific host identified by the address in the directed advertisement, responds to the advertisement packet and connects to the slave/peripheral device. Even in the directed advertisement method, the slave/peripheral device does not have any control over the connection and if a host, which is not identified in the advertisement packet, initiates a connection with the slave/peripheral device in response to the advertisement packet, then the slave/peripheral device assumes that the host is the specific host it identified in its advertisement packet and connects to the host. In the previous example, if a headphone sends directed advertisement packets addressing to a music player and instead a computer initiates a connection with the headphone, then headphone has no control over the connection and will end up connecting with the computer.

Further, due to various security reasons, host devices routinely change their address to avoid being targeted by malicious hacking attacks. In such case, a slave/peripheral device such as a BLE slave/peripheral device, has no way to know the new host address especially, when the BLE slave/peripheral device wakes up from an inactive or sleep state and tries to look for the host it was connected to earlier (by sending directed advertisement). This may result in the BLE slave device's advertisements not detected by the correct host (loosing connection with the correct host) or get connected to a wrong host.

SUMMARY

In accordance with an embodiment an apparatus is disclosed. The apparatus includes a transceiver, a processor, coupled to the transceiver and configured to receive a connection request from a first host device, establish connection with the first host device, authenticate the first host device, if the first host device is not authenticated, initiate an advertising state of the apparatus without terminating the connection with the first host device.

In accordance with another embodiment, a method is disclosed. The method includes, receiving a connection request from a first host device, establishing connection with the first host device, authenticating the first host device, and if the first host device is not authenticated, initiating an advertising state without terminating the connection with the first host device.

In accordance with yet another embodiment, a device is disclosed. The device includes a processor configured to broadcast advertising packets in a network to request a first connection from a first host device without terminating a second connection from a second host device.

DETAILED DESCRIPTION

The following description provides many different embodiments, or examples, for implementing different features of the subject matter. These descriptions are merely for illustrative purposes and do not limit the scope of the invention.

According to an embodiments, a system and method is disclosed for verifying a host/master during a Bluetooth Low Energy or Bluetooth Smart connection establishment process ensuring that a peripheral or slave device is connected to a desired host/master and drops the connection if an undesired host/master establishes the connection with the peripheral or slave device in response to advertisement by the peripheral or slave device. Various embodiments enable peripheral devices to arbitrate and form a Bluetooth Smart connection with a desired host device among multiple paired host devices available within the communication range.

Figure 1:
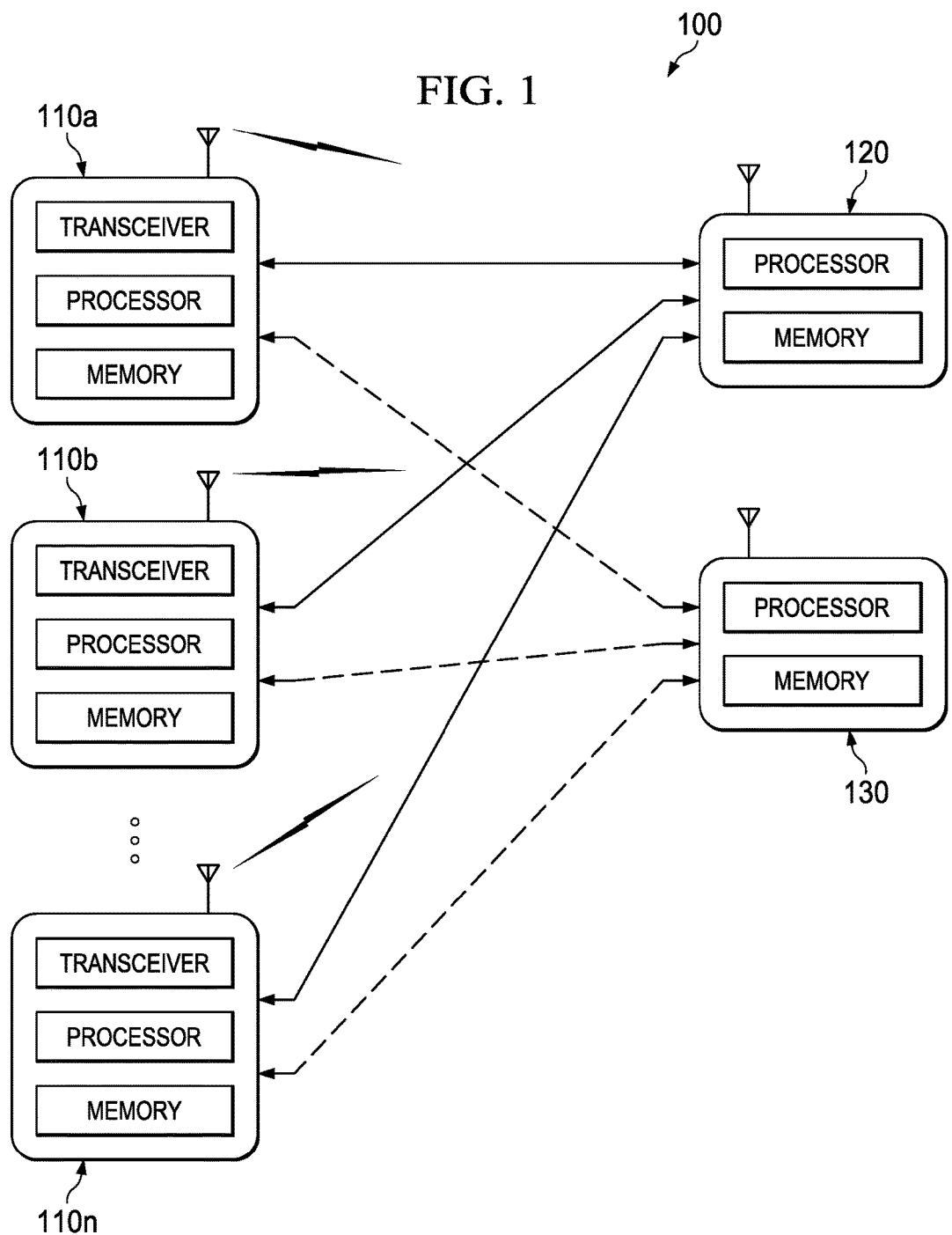
FIG. 1 illustrates an exemplary network system according to an embodiment.

Referring to FIG. 1, an exemplary network system 100 is illustrated according to an embodiment. The network system 100 includes peripheral devices 110a-110n. Peripheral devices 110x can be any device capable of wireless communication using at least Bluetooth Low Energy (BLE) or Bluetooth Smart protocol. These peripheral devices may include headphones, home security systems, key boards, remote control devices, appliances, key fobs, and the like. The network system 100 further includes at least host devices 120 and 130. Host devices 120 and 130 can be any devices that can communicate with the peripheral devices 110x through BLE protocol and assume the role of Master device for the communication. The host devices may include entertainment systems, computers, network elements, and the like. Each host device can connect with multiple peripheral devices; however, each peripheral device can only communicate with one host at a time. Each peripheral device 110x and host 120 and 130 further include processors, memories, transceivers, antennas, and other sub-elements (not shown) that may be needed to enable these devices to perform intended functions and communicate using at least the BLE protocol.

Figure 2:
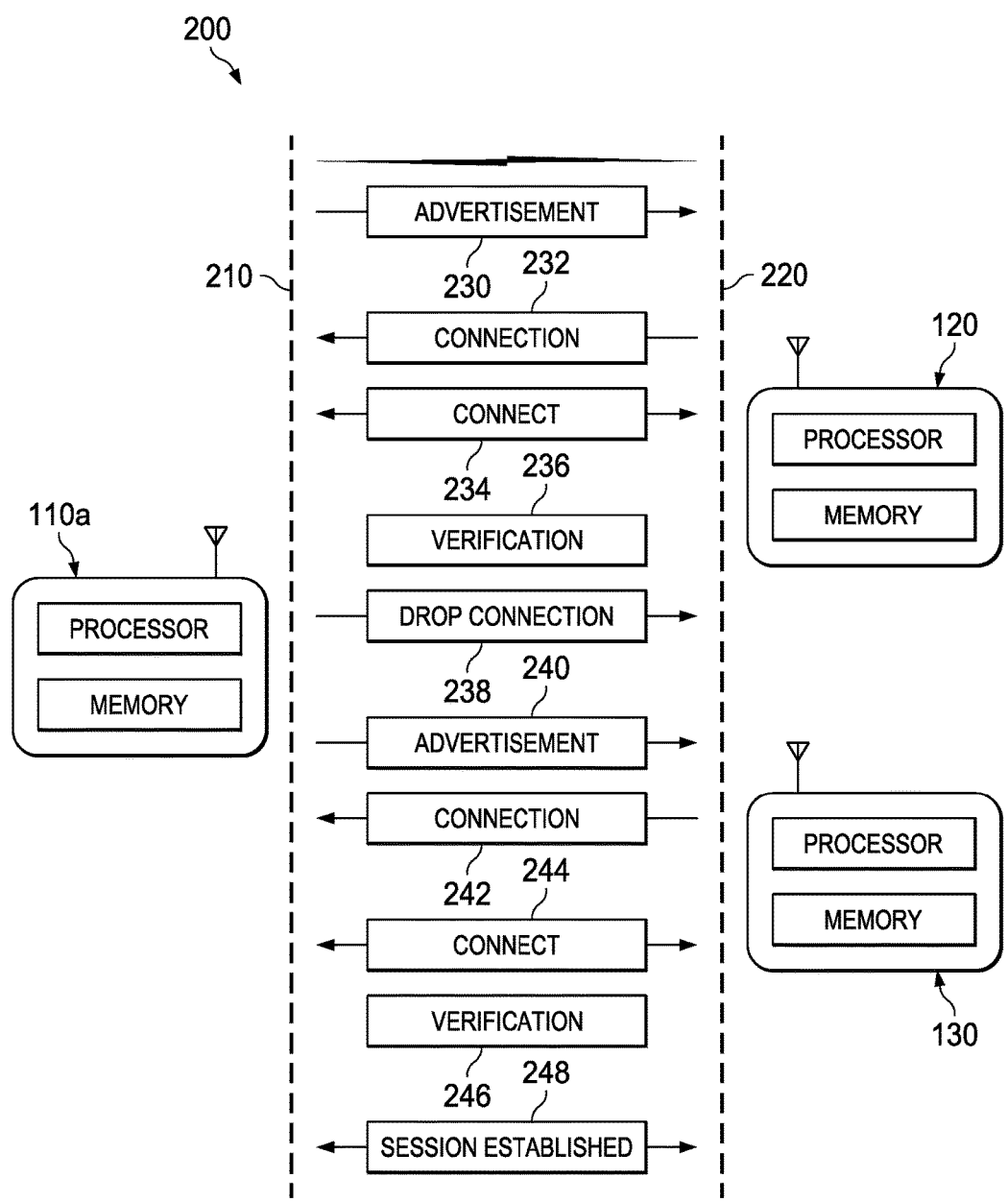
FIG. 2 illustrates an exemplary network communication process for establishing connection over BLE protocol according to an embodiment.

Referring to FIG. 2, an exemplary network communication process 200 for establishing connection over BLE protocol is illustrated according to an embodiment. For explanation purposes, the exemplary network communication process 200 illustrates two communication domains 210 and 220; however, one skilled in the art will appreciate that numerous communication domains can exist in the communication network. When peripheral device such as, for example, device 110a establish a connection over BLE protocol, then initially the device broadcast advertisement packets 230 indicating the need to establish a communication. When advertisement packets 230 are received by host devices such as, for example, devices 120 and 130, then each one of them can independently send a connection command to the peripheral device 110a.

As stated hereinabove, if the advertisement packet 230 is an advertisement to form a connection say, for example, to host device 120, then the host device 120 responds with connection command to the peripheral device; however, that does not forbid the host device 130 from establishing connection with the peripheral device 110a. When the host device 130 receives the advertisement packet 230, it can send a connection command 232 to the peripheral device 110a. In BLE protocol, after sending the advertisement packet 230, the peripheral device 110a, which is also a slave device, does not have any control over the connection with the host device, which is a master device also. Conventionally, Bluetooth allows a secure pairing process, which allows two devices to exchange pairing key information; however, most BLE enable devices do not have a user interface, such as for example, a headphone, therefore these devices cannot follow two-way pairing key exchange and must rely on host devices to connect to the right BLE peripheral device or the host device might have paired with the peripheral device earlier and hence the BLE peripheral device must enter into a BLE connection with the host device. The peripheral device 110a accepts connection from a host in response to advertisement packet regardless of which host it comes from. In the exemplary illustration, the peripheral device 110a intends to establish a connection with the host device 120; however, it receives a connection command 230 from the host device 130.

The peripheral/slave device 110a accepts the connection command from the host/master device 130 and establishes a connection 234 with the host device 234. Conventionally, the peripheral device 110a does not have any option after establishing the connection with the host device 130 and cannot locate the intended host device 120. According to an embodiment, after establishing the connection, the peripheral device 110 authenticates the host device 230 to ensure that it is connected to the right host. The authentication process can include various authentication schemes. In the exemplary embodiment, the peripheral device 110a may verify the address of host 130 using a long-term authentication key that the peripheral device 110a may have received form the host device 120 during an earlier session. The long-term authentication keys can be generated using various means and can be communicated to the peripheral device either during 'pairing' communication sessions or can be preprogrammed.

In an exemplary embodiment, the long-term authentication key can be generated using the Bluetooth Device Address of the host device 120. The Bluetooth Device Address is a unique address assigned by the standard organization Bluetooth Special Interest Group (SIG) to each manufacturer of the host device. Because in the BLE protocol the peripheral/slave device 110a does not have any control over the connection establishment, the use of unique device address for long-term authentication key enables the peripheral device 110a to verify the correct host from the information received in the connection command packet. One skilled in the art will appreciate that the long-term authentication keys can be generated using any connection related or other parameters that can enable the peripheral device 110a to authenticate a host device without further communication with the host device.

In the exemplary embodiment, the peripheral device 110a authenticates the host device 130 after the connection is established (236) and determines that it is connected to a wrong host device. The peripheral device 110a then drops the connection 238 to the host device 130. The peripheral device then restarts the advertisement process by broadcasting advertisement packets 240 again. In the exemplary illustration, after receiving the advertisement packet 240, the host device 120 send a connection command 242. The peripheral device again does not have any control over the connection from a master device so it establishes a connection 240 with the host 120. The peripheral device then authenticates (246) the host device 120 and it verifies that now a correct host has connected to it and maintains the connection 248.

The authentication process limits the peripheral device 110a to establish connection with certain devices only for example, a headphone may establish connection with certain music players only and may not allow connection with other devices such as for example a computer. Similarly, a manufacturer of peripheral device may limit connection to particular host devices only by preprogramming host device's authentication keys in the peripheral devices. To facilitate the use of peripheral devices with other host devices, the feature for authentication can be made an optional feature such as for example, a user may want to connect headphones or similar peripheral devices to computer instead of a music player to watch streaming videos on Internet etc. To facilitate the use of peripheral devices with other host devices, the feature can be enabled/disabled using various means such as for example, a mechanical toggle on-off switch on the peripheral devices can indicate that the authentication is required for each connection. Peripheral devices can also be programmed with a "whitelist" of host devices that can be connected with the peripheral devices or a "blacklist" of host devices that cannot be connected with the peripheral devices. These lists can also be dynamically build, maintained, updated, or terminated by peripheral devices during operation.

Figure 3:
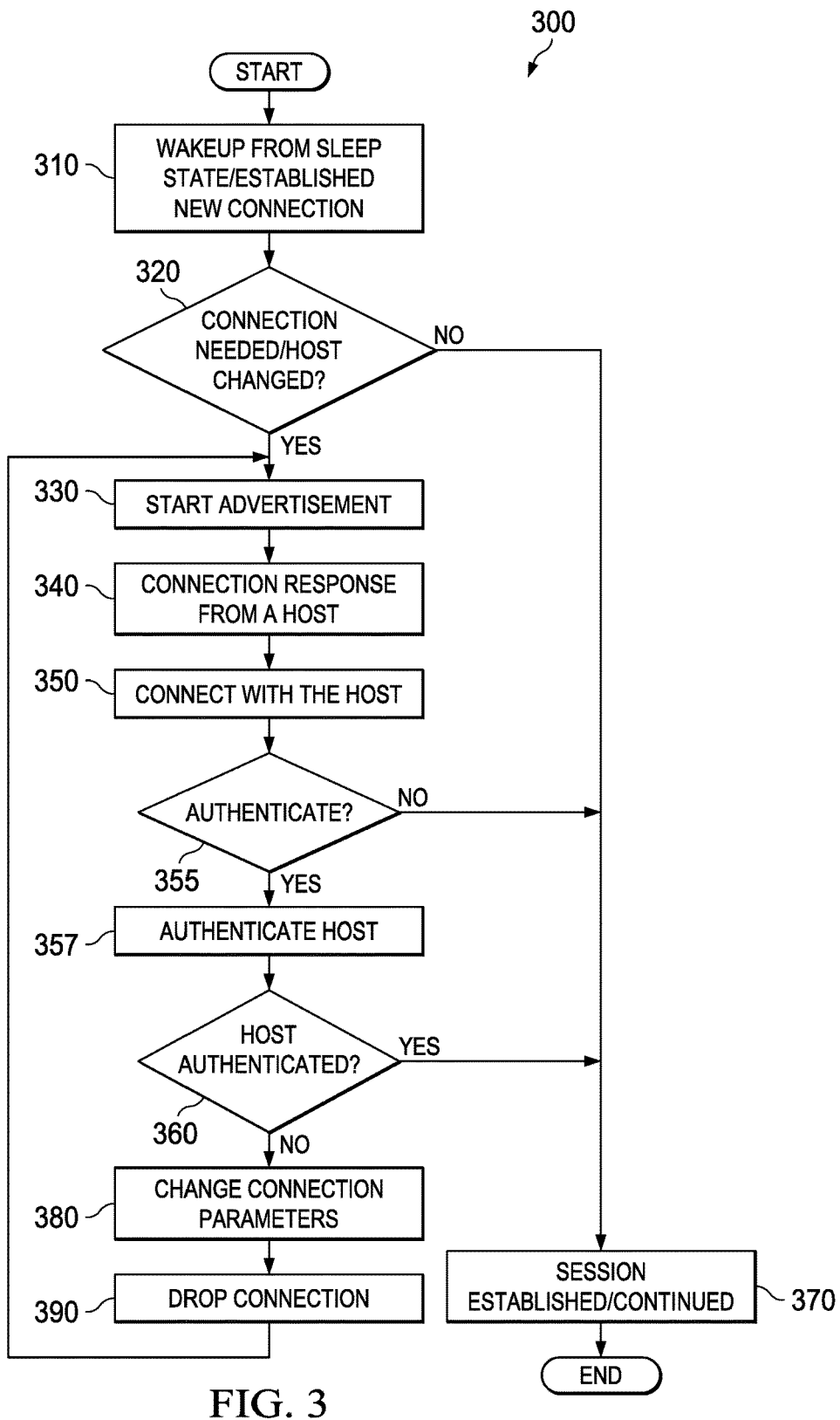
FIG. 3 illustrates an exemplary process flow for establishing an authenticated BLE communication according to an embodiment.

Referring to FIG. 3, a process flow for establishing an authenticated BLE communication is illustrated according to an embodiment. At 310, a peripheral device may establish a connection with a host device when the peripheral device is initiating a new communication session, waking up from an inactive or sleep state, or losing connection with the host device for various reasons. At 320, the peripheral device determines whether a new connection is needed or an existing connection is lost for some reason, such as, for example, as stated hereinabove, the host device may change its communication address for security reason and the peripheral device tries to connect with the paired host, which has changed its address, then it will cause the peripheral device to not recognize the new host address. If the peripheral device does not need a connection, then the peripheral device continues the existing communication session with the host at 370.

If the peripheral device determines that a connection has been lost with the host device or a new connection is needed, then at 330, the peripheral device starts advertising for connection. The advertising process is defined by the Bluetooth Low Energy or Bluetooth Smart protocol. While Bluetooth Low Energy protocol is used for exemplary illustrations, one skilled in the art will appreciate that the teaching of current embodiments can be used for any wireless or wireline communication protocol for example, a WiFi connection, traditional Bluetooth connection, Cellular communication protocol (LTE, LTE-A, 3G, etc.) based connections, and the like. For use in other communication protocol, the exemplary embodiment may use protocol specific connection establishment process.

In response to the advertisement or connection request, the peripheral device receives a connection response from a host/master device at 340. As stated hereinabove, in BLE protocol, a peripheral or slave device has no control over which host/master makes connection with the peripheral device. Thus, at 350, the peripheral device connects to the host/mast that responds to its advertisement. After the connection is established, at 355, the peripheral device determines whether to authenticate the host/master device that it just got connected to. The determination about whether to authenticate a host/master device can be based on various factors such as the peripheral device can check a flag or indication indicating a need to authenticate. As explained, these indications can be in various forms such as, for example, a mechanical switch, an internally programmed indication, a table/list, or the like. If the host/master device does not need to be authenticated, then the peripheral device proceeds to continue with the connection and communicates with the host/master device.

In an embodiment, the indication for authentication can be turned off at the initial connection stage and then can be turned on after an authenticated host is connected to the peripheral device. For example, when a user buys a new headphone, then the user may want to connect it to its music player and once the headphone is connected to the music player, the authentication process can be initiated to ensure no other host/master takes over the headphones. For various security reasons, the authentication process can also be timed for example, each peripheral device may maintain a timer for each authenticated host/master device and when the timer expires, the host/master device may become unauthenticated and the peripheral device may need to reestablish the authentication. The timer can be reset if the host initiates communication with the peripheral device within a prescribed time. Similarly, white/backlists can also have an expiration time after which each list may need to be reestablished or there can be a manual reset for all authentication for example a reset switch or turning power off or the like.

When a host/master device needs to be authenticated, the peripheral device initiates authentication process at 357. In an embodiment, this authentication procedure can be in addition to the BLE standard authentication procedure of updating signature and short term keys. The authentication process may include confirming authenticated host specific parameters such as verifying long-term keys, verifying the host parameters with white/blacklists etc. If the host/master is authenticated, then the peripheral device continues with the connection at 370. If the host/master device is not authenticated, then the peripheral device changes its connection parameters with the unauthenticated host at 380. The changing of connection parameters may include for example, requesting the unauthenticated host to change the connection timeout period. The connection timeout period is inactivity time period during which the host device keeps the connection with the peripheral device without receiving any communication packet form the peripheral device. This allows the peripheral device to search for another host device while the unauthenticated host keeps its connection with the peripheral device.

At 390, the peripheral device drops the connection with the unauthenticated host; however, it does not terminate the connection. Dropping the connection with the unauthenticated host means the peripheral device restarts and reinitializes itself to move into 'advertising' state at 330 and restarts the connection process. The termination of connection requires the peripheral device to send specific termination request to the host device. In the present example, the peripheral device does not terminate the connection but instead requests the unauthenticated host to extend the connection timeout period and reinitializes itself into 'advertising' state. Because the peripheral device does not terminate the connection with the unauthenticated host, the unauthenticated host remains in 'connected' state believing that the peripheral device is connected to it and keeps sending packets to the peripheral device. The peripheral device doesn't receive any of these packets and doesn't send any response packets to the unauthenticated host because the peripheral device is in 'advertising' state meaning it does not have any connection with any host and thus any packets addressed to it are not received or acknowledged.

Changing the connection timeout period allows the peripheral device to keep the unauthenticated host in 'connected' state believing that it is connected to the peripheral device while the peripheral device is searching for an authenticated host. Technically, the peripheral device loses the connection, but the unauthenticated host believes it's still connected to the peripheral device. When the unauthenticated host is in 'connected' state, it does not respond to any advertising packets. The unauthenticated host moves from the 'connected' state to 'scanning' state when the connection timeout period expires and it does not receive any response packets from the peripheral device. The connection timeout period is available for the peripheral device to advertise and get connected to an authenticated host. This also gives an opportunity to the peripheral device to take the unauthenticated host out of the possible available host connections while searching for an authenticated host. In the present example, the peripheral device has time period equal to at least the connection timeout period of the unauthenticated host to search for another authenticated host. If the peripheral device is successful in connecting with an authenticated host during the connection timeout period of the unauthenticated host, then the peripheral device connects to the authenticated host and continues the communication sessions.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A peripheral device, comprising:
    a transceiver; and
    a processor coupled to the transceiver, the processor configured to:
        send a first advertisement for a first connection,
        receive a first connection response from a first host device, after sending the first advertisement,
        establish the first connection with the first host device, in response to receiving the first connection response,
        initiate an authentication procedure for the first host device based on an identity of the first host device, after establishing the first connection with the first host device, and
        send a second advertisement for a second connection, without terminating the first connection with the first host device, in response to determining that the first host device is not authenticated during the authentication procedure.

2. The peripheral device of the claim 1, wherein the processor is further configured to:
    send, to the first host device, a request to change at least one connection parameter for the first connection, before sending the second advertisement.

3. The peripheral device of claim 2, wherein the at least one connection parameter is a connection timeout period for the first connection.

4. The peripheral device of claim 1, wherein the processor is further configured to:
    receive a second connection response from a second host device.

5. The peripheral device of claim 1, wherein initiating the authentication procedure for the first host device comprises verifying a digital key of the first host device.

6. The peripheral device of claim 5, wherein the digital key of the first host device is a long-term key based on a device address of the first host device.

7. The peripheral device of claim 6, wherein the device address is a Bluetooth device address of the first host device.

8. A method comprising:
    sending, by a peripheral device, a first advertisement for a connection;
    receiving, by the peripheral device, a first connection response from a first host device, after sending the first advertisement;
    establishing, by the peripheral device, a first connection with the first host device, in response to receiving the first connection response;
    initiating, by the peripheral device, an authentication procedure for the first host device based on an identity of the first host device, after establishing the first connection with the first host device; and
    sending, by the peripheral device, a second advertisement for a second connection, without terminating the first connection with the first host device, in response to determining that the first host device is not authenticated during the authentication procedure.

9. The method of the claim 8, further comprising:
    sending, by the peripheral device to the first host device, a request to change at least one connection parameter for the first connection, before sending the second advertisement.

10. The method of claim 9, wherein the at least one connection parameter is a connection timeout period for the first connection.

11. The method of claim 8, further comprising:
    receiving, by the peripheral device from a second host device, a second connection response.

12. The method of claim 8, wherein initiating the authentication procedure for the first host device comprises verifying a digital key of the first host device.

13. The method of claim 12, wherein the digital key of the first host device is a long-term key based on a device address of the first host device.

14. The method of claim 13, wherein the device address is a Bluetooth device address of the first host device.

15. The method of claim 8, wherein the peripheral device can only be connected to one host device at a time.

16. The method of claim 8, wherein initiating the authentication procedure is performed in response to determining to perform authentication.

17. The method of claim 16, wherein determining to perform authentication is performed based on a status of a toggle switch of the peripheral device.

18. The method of claim 8, wherein determining that the first host device is not authenticated comprises determining that the first host device is on a blacklist or determining that the first host device is not on a whitelist.

19. The method of claim 8, wherein establishing the first connection with the first host device is performed automatically in response to receiving the first connection response.

20. The method of claim 8, further comprising, in response to determining that the first host device is authenticated:
   initiating a timer;
   communicating, by the peripheral device with the first host device, while the timer runs; and
   re-initiating the authentication procedure with the first host device, in response to determining that the timer has expired.

* * * * *